United States Patent [19]

Röder

[11] Patent Number: 4,505,446
[45] Date of Patent: Mar. 19, 1985

[54] MEANS FOR REMOVABLY SECURING A DECORATIVE ITEM TO A NONPOROUS SURFACE

[75] Inventor: Manfred Röder, Frankenthal, Fed. Rep. of Germany

[73] Assignee: Smithers-Oasis Company, Kent, Ohio

[21] Appl. No.: 502,137

[22] Filed: Jun. 8, 1983

[30] Foreign Application Priority Data

Jun. 9, 1982 [DE] Fed. Rep. of Germany ....... 3221714

[51] Int. Cl.³ .............................................. F16B 47/00
[52] U.S. Cl. ................................................ 248/205.8
[58] Field of Search ................... 248/206 R, 362, 363; 269/21; 362/397; 294/64.1; 200/153 LA

[56] References Cited

U.S. PATENT DOCUMENTS

| 292,687 | 1/1884 | Scott | 200/153 LA |
| 3,747,170 | 7/1973 | Kieves | 248/206 R |

FOREIGN PATENT DOCUMENTS

| 803187 | 3/1951 | Fed. Rep. of Germany ... 248/206 R |
| 2351302 | 9/1977 | France ............................. 248/206 R |

Primary Examiner—William H. Schultz
Assistant Examiner—Robert A. Olson
Attorney, Agent, or Firm—Renner, Kenner, Greive & Bobak

[57] ABSTRACT

The present invention is directed to means for demountably securing the housing (3) of a container for presenting decorative items to a smooth surface irrespective of its inclination. A rubber suction cup (12) is operatively attached to the bottom of the container housing (3), and a pin (11) is secure to, and extends upwardly from, the central, distortable, portion of the cup (12). The pin (11) is axially translatable within a sleeve guide (4) mounted behind the cup (12) on the housing (3). At least one thrust rod (6) is translatable radially with respect to the pin (11) and slideably received within a pair of aligned slots (5 & 13) which penetrate the pin (11) and sleeve guide (4), respectively. The thrust rod (6) presents an obliquely inclined camming surface (9) which engages the slot (13) such that radial translation of the thrust rod (6) effects axial translation of the pin (11) to actuate the vacuum cup (12). The camming surface (9) does not interact with slot (13).

1 Claim, 2 Drawing Figures

MEANS FOR REMOVABLY SECURING A DECORATIVE ITEM TO A NONPOROUS SURFACE

TECHNICAL FIELD

The present invention relates to a mounting means by which removably to secure a decorative item to a smooth surface. More particularly, the present invention relates to an improved suction cup actuating means by which to secure a decorative item to a nonporous surface. Specifically, the present invention relates to a unique suction cup actuating mechanism by which releasably to secure a container which presents what is generically known as a floral foam for supporting a decorative arrangement to a smooth surface.

BACKGROUND ART

Floral foam such as that sold under the Trademark OASIS, and available from the Smithers Company, Hudson, Ohio, is widely known and used as a means by which to support decorative arrangements. Floral foam is sufficiently frangible that the stems of flowers, and/or weeds, sticks or various other decorative materials can be inserted into the foam with relative ease and yet the foam is sufficiently strong that it can support the vast majority of decorative articles that are so inserted. The floral foam is readily received in a variety of containers, but it is sometimes difficult to secure the container to the surface on which it is to repose. The difficulty is engendered when the container is to repose on a nonporous surface. Representative of such surfaces are those of glass, plastic, ceramic, or metal. The difficulty is minimal if the surface if flat but becomes noticeable if the surface is slightly curved and is compounded when the surface is oriented in an inclined, or vertical, disposition, such as walls, or mirrors, in homes or offices and even windows of automobiles.

Hertofore, the use of suction cups has been attempted, but rather unsuccessfully. The use of a bare suction cup is not sufficiently reliable, and the prior art has, therefore, experimented with the use of a suction cup that is mechanically actuated to apply and maintain the sub-atmospheric pressure, or partial vacuum, within the cup necessary for it to adhere to the desired surface. One prior art attempt mechanically to actuate a suction cup employs a container that is attached to a suction cup and relatively rotatable with respect thereto, the relative rotation actuating the mechanism whereby to deform the cup, as required to cause it to adhere. Hence, the cup would be positioned against the surface to which it is to be adhered and while so maintaining the cup, the container must be rotated to deform the cup in order to reduce the air pressure therein. The required rotation of the container, however, renders it virtually impossible to orient the container at a desired, predetermined disposition. One could come close to the desired disposition by trial and error, but even relatively hardy arrangements can be damaged by the continued rotation and retrorotation required to achieve the particularly desired disposition.

Other prior art approaches have included the use of magnets on the bottom of the container. This may be satisfactory if the mounting surface is iron, but it is totally unsatisfactory with most other metals and with all non-metallic surfaces. If the mounting surface is not magnetizable, it has been suggested that a rubber pouch be employed to receive iron fillings and the pouch itself be anchored to the surface so that the container can be demountably secured to the pouch. No fully successful means for releasably securing the pouch has been suggested, and if the pouch is permitted to slide along the surface on which it is positioned, it can readily damage that surface.

SUMMARY OF THE INVENTION

It is, therefore, a primary object of the present invention to provide a means for removably securing a decorative item to a nonporous surface.

These and other objects, as well as the advantages thereof over existing and prior art forms, will be apparent, in view of the following detailed description of the attached drawings, and are accomplished by means hereinafter described and claimed.

In general, a means by which removably to secure a decorative item to a smooth surface according to the concept of the present invention employs a container within which the decorative item is carried, as for example, by the use of floral foam.

A suction cup is presented from the end of the container opposite the decorative item, and behind the suction cup the container presents a bracket-like arrangement which supports a sleeve guide. A pin is secured to the medial portion of a suction cup and is slideably received within the sleeve guide. The peripheral flange of the suction cup may also be secured to the housing of the container. At least one thrust rod is oriented radially of the guide sleeve—and the pin slideably received therein—and extends slideably through appropriate apertures in the bracket and pin. A camming surface on the thrust rod interacts with the pin to actuate the suction cup.

One preferred embodiment of the present invention is shown by way of example in the accompanying drawings and described in detail without attempting to show all of the various forms of modifications in which the invention might be embodied; the invention being measured by the appended claims and not by the details of the specification.

PREFERRED MODE FOR CARRYING OUT THE INVENTION

Figure 1:
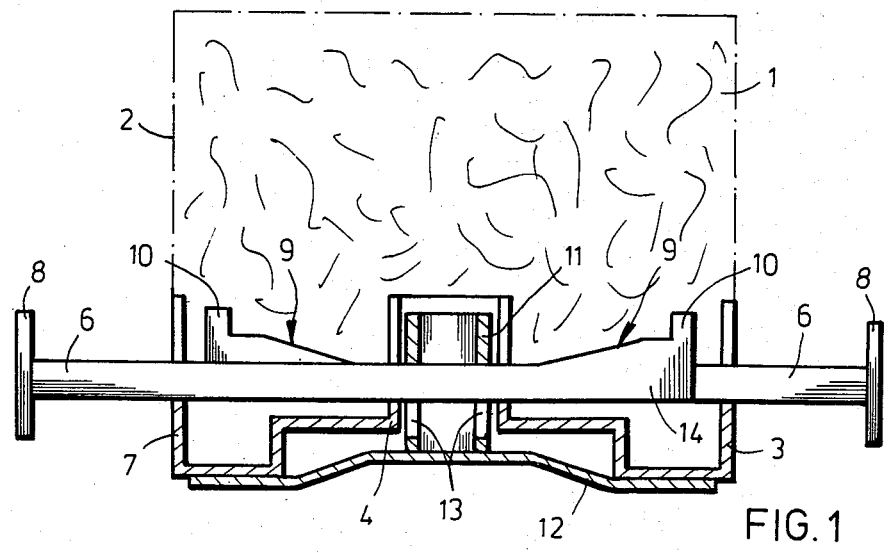
FIG. 1 is a cross sectional view through an exemplary embodiment of a container which employs the concept of the present invention; and, FIG. 2 is a plan view of the container depicted in FIG. 1 with the means for holding the decorative item removed.

The container represented in the drawings presents a block of floral foam 1 which constitutes the support 2 into which decorative items can be inserted and retained. The support 2 is secured to the housing 3 of the container. The housing 3 in the example depicted is constructed in a circular cross section, however, a quadrangular or other polygonal configuration may be selected with equal facility. In the central portion of the housing 3 a sleeve guide 4 is presented; the guide being transversely slotted, as at 5. At least one, but, as shown, two thrust rods 6 may be insertably received through the slot 5, and each thrust rod 6 is braced by engagement with the edge of the housing 3, as best seen in FIG. 1. Each thrust rod presents an obliquely oriented camming surface 9 which terminates in a raised portion 14.

Both the camming surface and the raised portion are disposed within the housing to operate as hereinafter more fully described. An operating knob 8 is provided on the end of the thrust rod extending outwardly of the housing, and a limit stop 10 is provided to preclude inadvertent removal of the thrust rod.

A pin 11 is received inside the sleeve guide 4 for axial translation, and the lower end of the pin 11 is secured to the central, distortable portion of a rubber suction cup 12; the peripheral flange of the cup 12 may, if desired, be secured to the housing.

A transverse slot 13 passes through the pin 11 to receive the thrust rod 6. The axial dimension of the slot 13 is selected to interact with the camming surface 9 whereby to actuate the suction cup 12, and the raised portion 14 enages the slot 13 to maintain the cup distorted, as required to sustain the reduced pressure within the cup and thereby make it stick to the desired surface.

Figure 2:
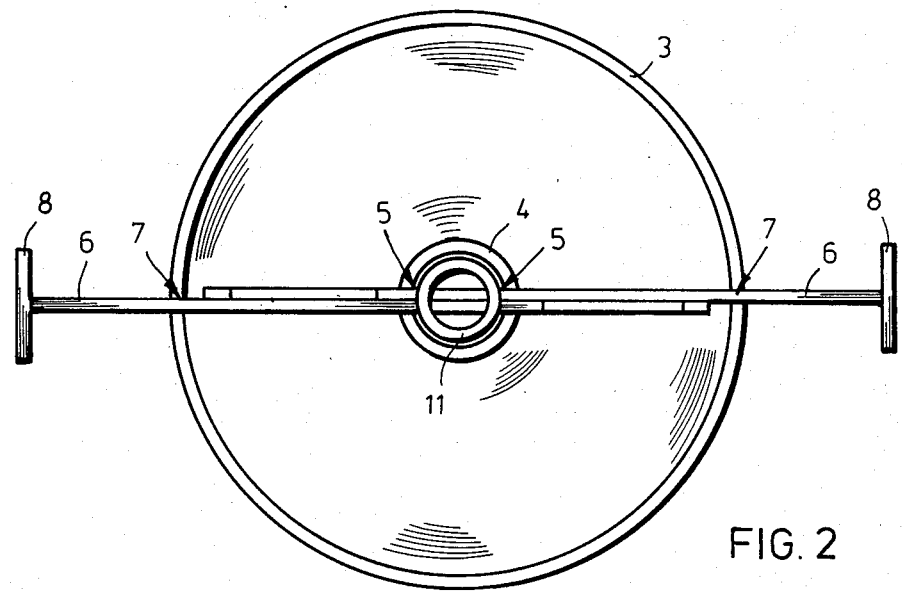

The fastening means on the container operates in the simplest manner. In operation, the thrust rods 6 are first disposed in the starting position (as depicted in FIGS. 1 and 2), and when the container is disposed against the surface on which it is to be mounted in the orientation desired, one may translate the thrust rods radially outwardly to drive the pin 11 axially upwardly by interaction of the slot 13 with the obliquely oriented camming surfaces 9, thereby generating a partial vacuum between the cup 12 and the surface to which the container is to be mounted. When the raised portion 14 of the thrust rods 6 engage the slot 13 the pin 11 will be maintained in its axially displaced position, and the operator need no longer hold onto the knob 8. To remove the container, the operator need merely translate the thrust rod in the opposite direction to release the pin 11 and allow the cup to collapse against the surface on which the container is positioned.

Once the concept of the present invention is understood, one can readily select a configuration for the thrust rods that will permit a selection of the direction in which they are translated to actuate the suction cup 12.

As such, a container embodying the concept of the present invention can demountable secure a decorative item to a smooth surface with absolute ease and otherwise accomplish the objects of the invention.

I claim:

1. In combination with a container having a housing and intended to support a decorative item, means demountable to secure the container to a smooth surface, said securing means comprising: a suction cup attached to said housing; a pin secured to a central portion of said suction cup; a guide presented from said housing; said pin being axially translatable within said guide; said pin being provided with a transverse slot; a pair of thrust bars; an oblique camming surface presented from each said thrust bar; said camming surfaces being oriented in opposition, one to the other; said thrust bars being translatable within said transverse slot radially of said pin; said camming surfaces engaging said transverse slot such that radial translation of said thrust bars effects the application of equal and opposite forces against said pin axially to translate said pin and thereby actuate said suction cup.

* * * * *